United States Patent
Chernyshov et al.

(10) Patent No.: US 8,605,555 B1
(45) Date of Patent: Dec. 10, 2013

(54) RECORDING MEDIA WITH MULTIPLE BI-LAYERS OF HEATSINK LAYER AND AMORPHOUS LAYER FOR ENERGY ASSISTED MAGNETIC RECORDING SYSTEM AND METHODS FOR FABRICATING THE SAME

(75) Inventors: Alexander S. Chernyshov, San Jose, CA (US); Hua Yuan, Fremont, CA (US); Bogdan Valcu, Fremont, CA (US); Antony Ajan, Santa Clara, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/451,380

(22) Filed: Apr. 19, 2012

(51) Int. Cl.
*G11B 11/00* (2006.01)

(52) U.S. Cl.
USPC ............ 369/13.33; 369/13.13; 360/131; 428/829

(58) Field of Classification Search
USPC .......... 369/13.33, 13.13, 13.32, 13.06–13.09, 369/13.39–13.56; 360/59; 385/129; 29/603.07–603.27
See application file for complete search history.

(56) References Cited

U.S. PATENT DOCUMENTS

| | | | |
|---|---|---|---|
| 7,862,914 B2 | 1/2011 | Kubota et al. | |
| 8,351,309 B2 * | 1/2013 | Kanbe et al. | 369/13.33 |
| 2005/0016836 A1 | 1/2005 | Kuo et al. | |
| 2005/0135010 A1 * | 6/2005 | Liu et al. | 369/13.33 |
| 2006/0154110 A1 * | 7/2006 | Hohlfeld et al. | 428/823 |
| 2007/0026263 A1 * | 2/2007 | Kubota et al. | 428/832 |
| 2008/0026255 A1 | 1/2008 | Das et al. | |
| 2011/0096432 A1 | 4/2011 | Lu et al. | |
| 2011/0277508 A1 * | 11/2011 | Osawa et al. | 65/97 |
| 2012/0251842 A1 * | 10/2012 | Yuan et al. | 428/800 |

FOREIGN PATENT DOCUMENTS

JP 2011-060344 3/2011

OTHER PUBLICATIONS

Chen, et al., "Structure and magnetic properties of L10 FePt film with Ag heat sink layer", J. Appl. Phys. 105, 07B724 (2009), Published by the American Institute of Physics, 4 pages.

* cited by examiner

*Primary Examiner* — Tan X Dinh

(57) ABSTRACT

An energy assisted magnetic recording (EAMR) system includes a magnetic recording medium including a plurality of bi-layers and a magnetic recording layer on the plurality of bi-layers, a magnetic transducer configured to write information to the magnetic recording medium, and a light source positioned proximate the magnetic transducer and configured to heat the magnetic recording medium. Each of the plurality of bi-layers includes a heatsink layer and an amorphous under-layer on the heatsink layer.

23 Claims, 5 Drawing Sheets

|  | Recording layer | Under-layer | [AUL/HS] |
|---|---|---|---|
| Sample A | FePt | MgO | [AUL(20)/HS(40)] x 1 |
| Sample B | FePt | MgO | [AUL(10)/HS(20)] x 2 |
| Sample C | FePt | MgO | [AUL(5)/HS(5)] x 4 |

| | Recording layer | Under-layer | AUL1 (nm) | Hs1 (nm) | AUL2 (nm) | Hs2 (nm) | AUL3 (nm) | Hs3 (nm) |
|---|---|---|---|---|---|---|---|---|
| Sample A | FePt | MgO | 70 | 30 | N/A | N/A | N/A | N/A |
| Sample B | FePt | MgO | 35 | 15 | 35 | 15 | N/A | N/A |
| Sample C | FePt | MgO | 50 | 10 | 10 | 10 | 10 | 10 |

| | Recording layer | Under-layer | AUL1 (nm) | Hs1 (nm) | AUL2 (nm) | HS2 (nm) |
|---|---|---|---|---|---|---|
| A | FePt | MgO | 70 | 30 | N/A | N/A |
| B | FePt | MgO | 35 | 15 | 35 | 0.5 |
| C | FePt | MgO | 35 | 7.5 | 35 | 22.5 |
| D | FePt | MgO | 35 | 15 | 17.5 | 32.5 |

RECORDING MEDIA WITH MULTIPLE BI-LAYERS OF HEATSINK LAYER AND AMORPHOUS LAYER FOR ENERGY ASSISTED MAGNETIC RECORDING SYSTEM AND METHODS FOR FABRICATING THE SAME

FIELD

Aspects of the present invention relate to energy assisted magnetic recording, and, in particular, to magnetic storage media with multilayer heatsinks for energy assisted magnetic recording.

BACKGROUND

Due to the increasing demand for more data storage, heat assisted or energy assisted magnetic recording concepts have been pursued as ways to achieve higher density magnetic recording. In an energy-assisted magnetic recording (EAMR) system, local heating is utilized to heat up a recording medium such that the coercivity of the recording medium can be reduced. With the coercivity of the heated location of the recording medium being temporarily reduced, an applied magnetic writing field can more easily direct the magnetization of the recording medium. The recording density is mainly controlled by the minimum thermal spot size in the recording medium that is produced by an optical near field transducer (NFT) at the excitation state (e.g., surface plasmon-resonance). Therefore, the reliability of the EAMR system is generally affected by the thermal stability of the recording media.

SUMMARY

According to an embodiment of the present invention, an energy assisted magnetic recording (EAMR) system includes a magnetic recording medium, a magnetic transducer configured to write information to the magnetic recording medium, and a light source positioned proximate the magnetic transducer and configured to heat the magnetic recording medium.

According to an embodiment of the present invention, a method for manufacturing an energy assisted magnetic recording (EAMR) system is provided. The method includes forming a magnetic recording medium; forming a magnetic transducer configured to write information to the magnetic recording medium; and positioning a light source proximate the magnetic transducer, the light source configured to heat the magnetic recording medium.

According to an embodiment, the magnetic recording medium includes a plurality of bi-layers on a substrate, each of the plurality of bi-layers including a heatsink layer and an amorphous under-layer on the heatsink layer; and a magnetic recording layer on the plurality of bi-layers.

BRIEF DESCRIPTION OF THE DRAWINGS

The above and other features and aspects of the present invention will become more apparent by describing in detail embodiments thereof with reference to the attached drawings.

FIG. 2a is a performance bar graph illustrating the differences in surface roughness (Ra) of different recording media samples with multilayer heatsinks as compared to a reference recording medium in accordance with multiple embodiments of the present invention. FIG. 2b is a legend for FIG. 2a.

FIG. 3a is a performance bar graph illustrating the differences in laser power for two different recording heads used to write data to two different recording media samples with multilayer heatsinks as compared to a reference recording medium in accordance with multiple embodiments of the present invention. FIG. 3b is a legend for FIG. 3a.

FIG. 4a is a bar graph illustrating the differences in wsSNR performance of four different recording media samples in accordance with multiple embodiments of the present invention.

FIG. 4b is a bar graph illustrating the differences in normalized laser power of the four different recording media of FIG. 4a.

FIG. 4c is a bar graph illustrating the differences in jitter performance of the four different recording media of FIG. 4a.

FIG. 4d is a bar graph illustrating the differences in linear density of the four different recording media of FIG. 4a.

DETAILED DESCRIPTION

Figure 1:
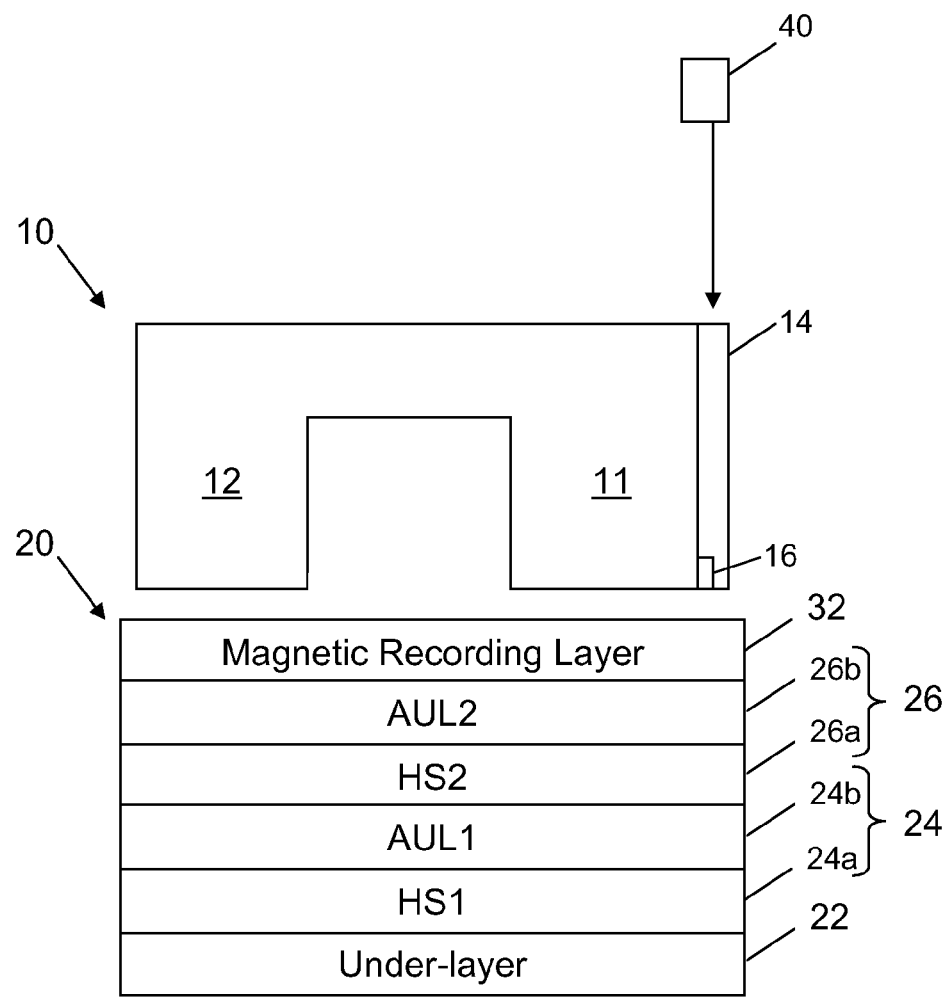
FIG. 1 is a cross-sectional view of a portion of an energy assisted magnetic recording (EAMR) system including an EAMR head and a recording medium with multilayer heatsinks according to an embodiment of the present invention.

Embodiments of the present invention are directed to magnetic recording media with a multilayer heatsink design, an energy-assisted magnetic recording (EAMR) system using the magnetic recording media, and methods for fabricating the EAMR system and magnetic recording media.

To achieve magnetic storage media with an areal density beyond 900 Gb/in$^2$ (gigabit per square inch), media with relatively small grain size (e.g., less than 6 nanometers) can be used. Therefore, relatively high anisotropy constant (Ku) materials, such as L10 ordered FePt alloys, can be used for a recording layer to sustain thermal stability. Due to a high anisotropy property, high Ku materials generally cannot be writable to with conventional magnetic recording heads. Therefore, either exchange coupled composite media structures or energy-assisted magnetic recording (EAMR) can be used to write data to storage media such as FePt based media. A typical recording medium for EAMR applications includes: a magnetic recording layer, a thermal resistance layer, and a heatsink layer. In an EAMR system, the EAMR recording head will often degrade quickly once high laser power is applied to the recording medium. By including a thermal resistance layer with a relatively low thermal resistance, the gradient of the recording medium can be improved, but higher laser power is needed. On the contrary, by including a thermal resistance layer with a relatively high thermal resistance, the gradient of the recording medium will deteriorate, but less laser power can be used. Therefore, the thermal design of the recording medium affects the performance of the EAMR system.

In a magnetic recording medium for EAMR applications, a heatsink and an inter-layer serve mutually competing purposes. A steady state temperature profile of the magnetic recording medium is controlled by the thermal resistance of the inter-layer and the thermal conductivity/thickness of the heatsink (lateral dissipation). The inter-layer can degrade gradient, but limits laser power used to reach the Curie temperature (TC). On the other hand, the heatsink can increase the cooling rate needed to achieve a high gradient and a small thermal spot, hence avoiding adjacent track erasure.

According to embodiments of the present invention, the magnetic recording medium includes a magnetic recording layer, a number of bi-layers each including an amorphous under-layer (AUL) and a heatsink (HS), and an under-layer. Suitable materials for the AUL include, but are not limited to, oxides, nitrides, borides, and other suitable amorphous materials such as CrTi, CrTa, NiTa, CoCrTaZr, CoFeZrBCr, CoTaZr, CoFeTaZr, CoCrWTaZr, CoCrMoTaZr, and CoZrWMo. Suitable materials for the HS include, but are not limited to, Ag, Al, Au, Cu, Cr, Mo, Ru, W, Cu—Zr, Mo—Cu, Ag—Pd, Cr—Ru, Cr—V, Cr—W, Cr—Mo, Cr—Nd, and/or combinations thereof. Because a thick crystalline heatsink layer deteriorates Ra, embodiments of the present invention can reduce Ra by using multiple relatively thin HS each passivated by an AUL. According to embodiments of the present invention, thermal design of a recording medium can be controlled by using multiple bi-layers of AUL/HS.

FIG. 1 is a cross-sectional view of a portion of an EAMR system including an EAMR head 10 and a recording medium 20 with multilayer heatsinks according to an embodiment of the present invention. Referring to FIG. 1, the EAMR head 10 includes a writing pole 11 and a return pole 12 for directing magnetic flux into the recording medium 20, which is positioned proximate and/or under the writing pole 11. Portions of the EAMR head 10 that are not pertinent to the current discussion of the present invention are not shown in FIG. 1. For example, the EAMR head 10 may include a read section (not shown) for reading the recording medium 20. The EAMR head 10 has a waveguide 14 that optically couples light from a light source 40 (e.g., a laser diode) to a near field transducer (NFT) 16. The NFT 16 utilizes the energy of the light to heat up a spot on the recording medium 20 where the writing pole 11 applies the magnetic flux.

Still referring to FIG. 1, the recording medium 20 includes a suitable substrate (not shown), an under-layer 22 on the substrate, a first bi-layer 24 on the under-layer 22 and including a first heatsink (HS1) 24a and a first amorphous under-layer (AUL1) 24b, a second bi-layer 26 on the first bi-layer 24 and including a second heatsink (HS2) 26a and a second amorphous under-layer (AUL2) 26b, and a magnetic recording layer 32 (e.g., L10 FePt, CoPt) on the second bi-layer 26.

While FIG. 1 illustrates two bi-layers of AUL/HS stacked in series, the present invention is not limited thereto. In several embodiments, the recording medium 20 can have more than two bi-layers of AUL/HS (e.g., 2 to 10 bi-layers), and the thicknesses of the AUL and HS layers can be the same or different from each other. In some embodiments, the thicknesses of the AULs of the different bi-layers can be the same or different from each other. In some embodiments, the thicknesses of the heatsinks of the different bi-layers can be the same or different from each other. In several embodiments, the AUL (24b and 26b) can include materials such as CrTi, CrTa, NiTa, CoCrTaZr, CoFeZrBCr, CoTaZr, CoFeTaZr, CoCrWTaZr, CoCrMoTaZr, CoZrWMo, and/or other suitable materials. In several embodiments, the HS (24a and 26a) can include materials such as Al, Ag, Au, Cu, Cr, Mo, Ru, W, Cu—Zr, Mo—Cu, Ag—Pd, Cr—Ru, Cr—V, Cr—W, Cr—Mo, Cr—Nd, and/or other suitable heatsink materials. In several embodiments, the under-layer 22 can include a material such as MgO and/or another suitable material. The recording medium 20 can improve thermal gradient without using higher laser power because the bi-layers (e.g., 24, 26) offer a greater degree of design variations with a number of parameters such as materials, material thicknesses, thermal conductivity, etc. Accordingly, a preselected thermal gradient and a preselected Ra of the recording medium 20 can be achieved.

In several embodiments, the recording medium 20 can further include a thermal resistance layer (not shown in FIG. 1) between the magnetic recording layer 32 and the bi-layers (24 and 26), and the thermal resistance layer is configured to facilitate the growth of the magnetic layer (e.g., FePt growth). The thermal resistance layer can include MgO and/or other suitable materials. In several embodiments, each of the AUL (24a and 26a) and HS (26a and 26b) of the bi-layers, can have a thickness between about 10 nm and about 100 nm.

First Comparative Example

Figures 2A, 2B:
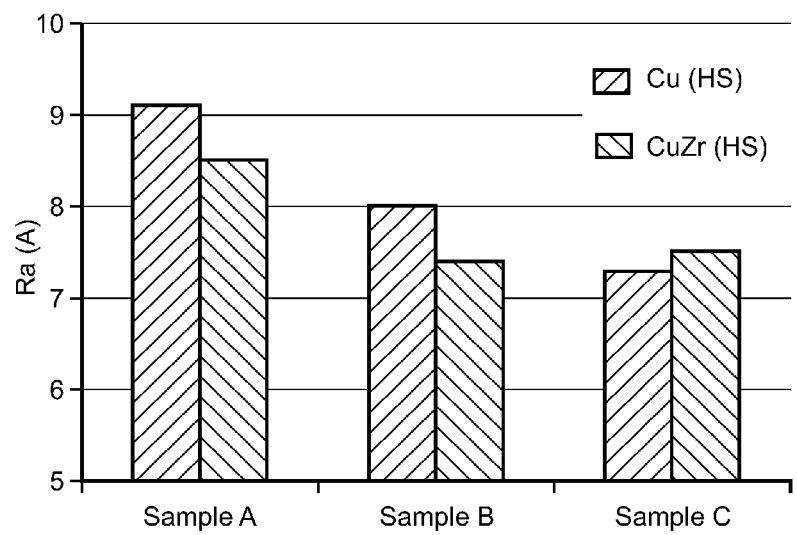

FIG. 2a is a performance bar graph illustrating the differences in surface roughness (Ra) of different recording media samples with multiple heatsinks as compared to a reference recording medium in accordance with multiple embodiments of the present invention. FIG. 2b is a legend for FIG. 2a. Sample A is a reference recording medium according to the related art, and has a single AUL and a single HS structure. In Sample A, the AUL has a thickness of about 20 nm, and the HS has a thickness of about 40 nm.

Sample B is a recording medium having a multilayer heatsink with two bi-layers of AUL/HS according to a first embodiment of the present invention. In Sample B, each AUL has a thickness of about 10 nm, and each HS has a thickness of about 20 nm. Sample C is a recording medium having a multilayer heatsink according to a second embodiment of the present invention. The multilayer heatsink of Sample C has four bi-layers of AUL/HS. In Sample C, each AUL has a thickness of about 5 nm, and each HS has a thickness of about 5 nm. Each of the Samples A, B, and C in FIGS. 2a and 2b has a recording layer including FePt and an under-layer including MgO. The AUL in each of the three Samples A, B, and C includes CoCrTaZr. The HS in each of the three Samples A, B, and C includes Cu or CuZr.

FIGS. 2a and 2b illustrate that each of Samples B and C has Ra (in a.u.) less than that of Sample A. Here, the results show that the Ra of the recording media can be improved or reduced by using multiple bi-layers of AUL/HS according to the first and second embodiments of the present invention.

Second Comparative Example

Figures 3A, 3B:
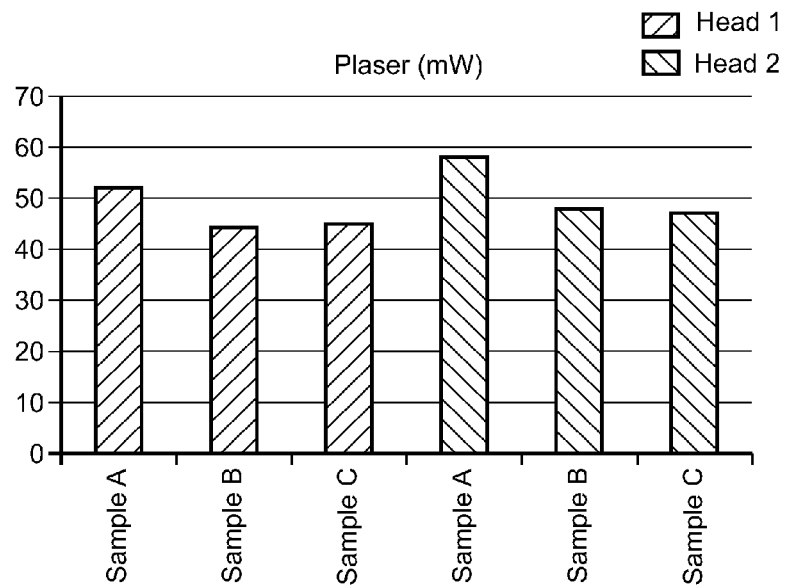

FIG. 3a is a performance bar graph illustrating the differences in laser power for two different recording heads used to write data to two different recording media samples with multilayer heatsinks as compared to a reference recording medium in accordance with multiple embodiments of the present invention. FIG. 3b is a legend for FIG. 3a. Sample A is the reference recording medium with a single AUL (AUL1) and a single HS (HS1) according to the related art. In Sample A, the AUL1 has a thickness of about 70 nm, and the HS1 has a thickness of about 30 nm. Sample B has a multilayer heatsink with two bi-layers of AUL/HS (AUL1/HS1 and AUL2/HS2) according to a third embodiment of the present invention. The thicknesses of AUL1, HS1, AUL2, and HS2 of Sample B are about 35 nm, 15 nm, 35 nm, and 15 nm, respectively. Sample C has a multilayer heatsink with three bi-layers of AUL/HS (AUL1/HS1, AUL2/HS2, and AUL3/HS3) according to a fourth embodiment of the present invention. The thicknesses of AUL1, HS1, AUL2, HS2, AUL3, and HS3 of Sample C are about 50 nm, 10 nm, 10 nm, 10 nm, 10 nm, and 10 nm, respectively. Each of the Samples A, B, and C in FIG. 3 has a recording layer including FePt and an under-layer including MgO. The AUL in each of the three Samples A, B, and C includes CoCrTaZr. The HS in each of the three Samples A, B, and C includes Ru.

Referring to FIGS. 3a and 3b, two different recording heads (different in transducer design geometry) are used to test Samples A, B, and C. FIGS. 3a and 3b show that both Samples B and C use less laser power to achieve recording than Sample A does. In other words, the multiple bi-layers of AUL/HS design of the third and fourth embodiments can reduce the laser power used to achieve recording.

Third Comparative Example

Figures 4A, 4B, 4C, 4D:
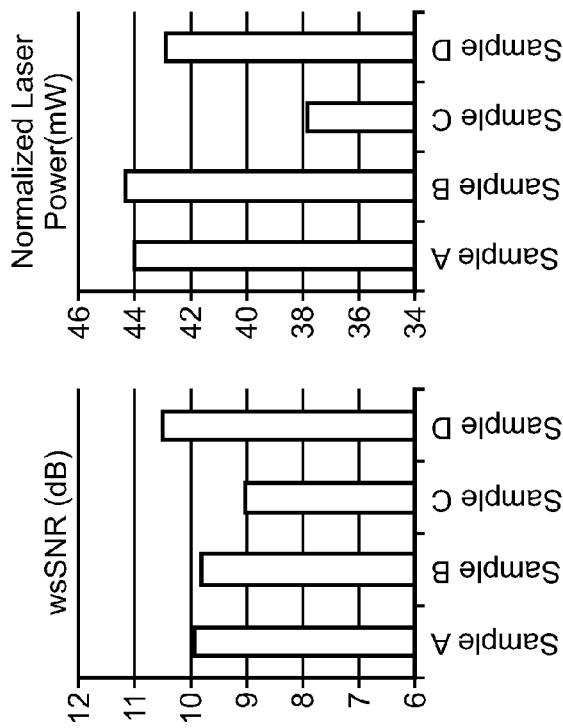
Figure 4E:
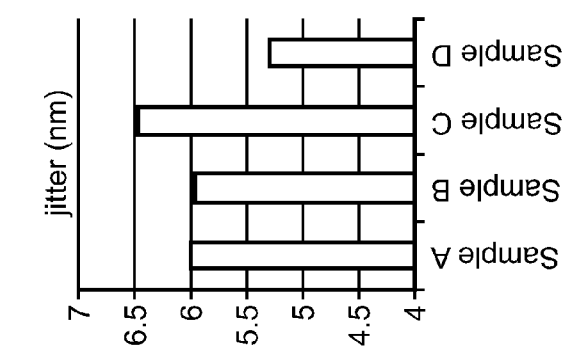
FIG. 4e is a legend for FIGS. 4a-4d.

FIGS. 4a-4d are bar graphs illustrating the differences in a number of recording characteristics of four different recording media samples including three media samples with multilayer heatsinks and a reference recording medium in accordance with multiple embodiments of the present invention. FIG. 4e is a legend for FIGS. 4a-4d. The recording characteristics for FIGS. 4a-4d include weighted-sum SNR (wsSNR), laser power, jitter, and D10 resolution, respectively. Referring to FIGS. 4a-4e, Sample A is the reference recording medium including a single AUL (AUL1) and a single HS (HS1) according to the related art. In Sample A, the AUL1 has a thickness of about 70 nm, and the HS1 has a thickness of about 30 nm. Each of Samples B, C, and D has a multilayer heatsink including two bi-layers of AUL/HS (AUL1/HS1 and AUL2/HS2) according to several embodiments of the present invention. The thicknesses of AUL1, HS1, AUL2, and HS2 of Sample B are about 35 nm, 15 nm, 35 nm, and 0.5 nm, respectively. The thicknesses of AUL1, HS1, AUL2, and HS2 of Sample C are about 35 nm, 7.5 nm, 35 nm, and 22.5 nm, respectively. The thicknesses of AUL1, HS1, AUL2, and HS2 of Sample C are about 35 nm, 15 nm, 17.5 nm, and 32.5 nm, respectively. Each of the Samples A, B, C, and D in FIGS. 4a-4e has a recording layer including FePt and an under-layer including MgO. The AUL in each of the Samples A, B, C, and D includes CoCrTaZr. The HS in each of the Samples A, B, C, and D includes Ru.

Referring to FIGS. 4a-4e, Sample B shows recording performance (wsSNR, laser power, and jitter) similar to Sample A. Sample C shows significant reduction in laser power, but inferior wsSNR and jitter. Sample D shows improvement in laser power, jitter, wsSNR, and D10. Thus, Samples B, C, and D of the present invention demonstrate that careful optimization of two bi-layers of AUL/HS design can improve the performance of the recording media.

Figure 5:
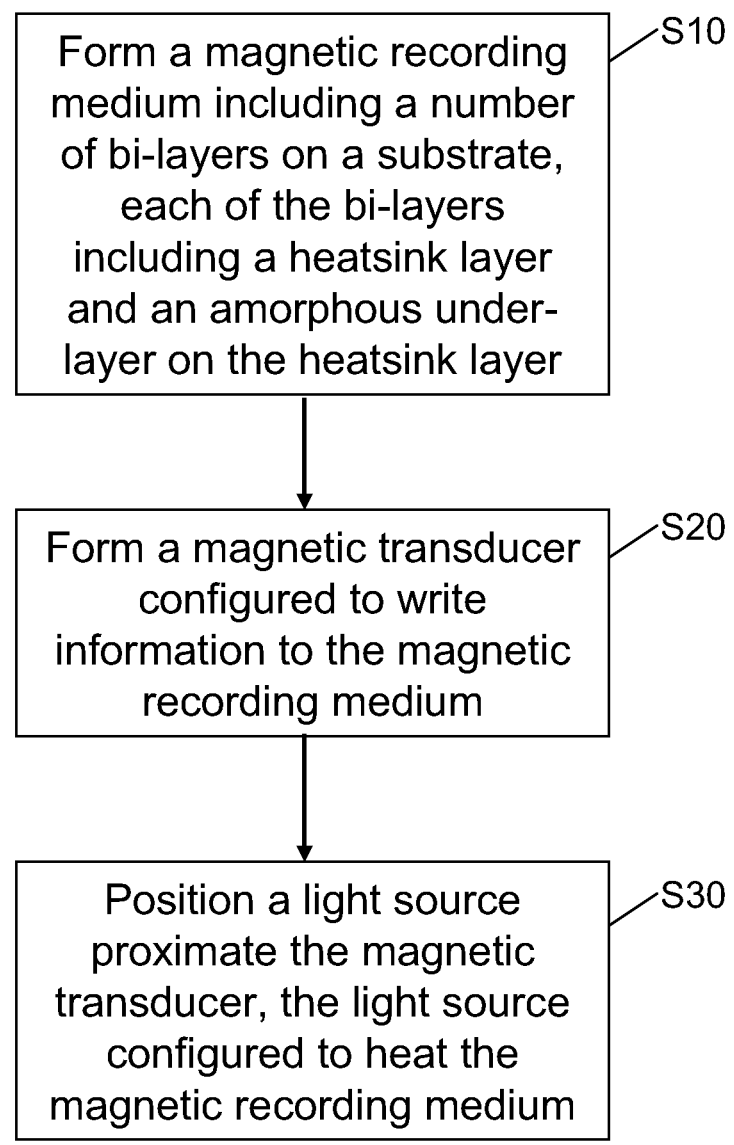
FIG. 5 a flowchart illustrating a method for manufacturing an EAMR system according to an embodiment of the present invention.

FIG. 5 is a flowchart illustrating a method for manufacturing an EAMR system according to an embodiment of the present invention. In block S10, a magnetic recording medium including a number of bi-layers is formed on a substrate. Each of the bi-layers includes a heatsink layer and an amorphous under-layer on the heatsink layer. In block S20, a magnetic transducer is formed and is configured to write information to the magnetic recording medium. In block S30, a light source is formed proximate the magnetic transducer, and the light source is configured to heat the magnetic recording medium. Each of the bi-layers includes a heatsink layer and an amorphous under-layer on the heatsink layer. The magnetic recording medium further includes a magnetic recording layer on the bi-layers.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

Accordingly, the above described embodiments of the present invention can significantly enhance magnetic recording media for EAMR applications. Further, recording performance can be improved without using higher laser power as compared to the related art, and the effective heat sink thickness can be increased without significantly impacting Ra.

While the present invention has been particularly shown and described with reference to several embodiments thereof, it will be understood by those of ordinary skill in the art that various changes in form and details may be made therein without departing from the spirit and scope of the present invention as defined by the following claims and their equivalents.

What is claimed is:

1. An energy assisted magnetic recording (EAMR) system comprising:
   a magnetic recording medium comprising:
      a plurality of bi-layers, each of the plurality of bi-layers comprising a heatsink layer and an amorphous under-layer on the heatsink layer; and
      a magnetic recording layer on the plurality of bi-layers;
   a magnetic transducer configured to write information to the magnetic recording medium; and
   a light source positioned proximate the magnetic transducer and configured to heat the magnetic recording medium.

2. The EAMR system of claim 1, wherein the amorphous under-layer comprises a material selected from the group consisting of CrTi, CrTa, NiTa, CoCrTaZr, CoFeZrBCr, CoTaZr, CoFeTaZr, CoCrWTaZr, CoCrMoTaZr, CoZrWMo, and combinations thereof.

3. The EAMR system of claim 1, wherein the heatsink layer comprises a material selected from the group consisting of Ru, W, Mo, Cu, Ag, Cr, Al, Cu—Zr, Mo—Cu, Ag—Pd, Cr—Ru, Cr—V, Cr—W, Cr—Mo, Cr—Nd, and combinations thereof.

4. The EAMR system of claim 1, further comprising a thermal resistance layer between a substrate and the plurality of bi-layers, wherein the thermal resistance layer is configured to facilitate FePt growth.

5. The EAMR system of claim 4, wherein the thermal resistance layer comprises a single layer of MgO.

6. The EAMR system of claim 1, wherein the magnetic recording layer comprises a material selected from the group consisting of FePt and CoPt.

7. The EAMR system of claim 1, wherein the plurality of bi-layers have a same thickness.

8. The EAMR system of claim 1, wherein the plurality of bi-layers have different thicknesses.

9. The EAMR system of claim 1, wherein the heatsink layer of a first bi-layer and the heatsink layer of a second bi-layer from among the plurality of bi-layers, have different thicknesses.

10. The EAMR system of claim 1, wherein the heatsink layer of a first bi-layer and the heatsink layer of a second bi-layer from among the plurality of bi-layers, have a same thickness.

11. The EAMR system of claim 1, wherein the amorphous under-layer of a first bi-layer and the amorphous under-layer of a second bi-layer from among the plurality of bi-layers, have different thicknesses.

12. The EAMR system of claim 1, wherein the amorphous under-layer of a first bi-layer and the amorphous under-layer of a second bi-layer from among the plurality of bi-layers, have a same thickness.

13. The EAMR system of claim 1, wherein the amorphous under-layer and the heatsink layer of a bi-layer of the plurality of bi-layers have a same thickness.

14. The EAMR system of claim 1, wherein the amorphous under-layer and the heatsink layer of a bi-layer of the plurality of bi-layers have different thicknesses.

15. The EAMR system of claim 1, wherein each of the amorphous under-layer and the heatsink layer of the plurality of bi-layers, has a thickness between about 10 nm and about 100 nm.

16. The EAMR system of claim 15,
wherein the plurality of bi-layers comprises a first bi-layer and a second bi-layer,
wherein the amorphous under-layer of the first bi-layer has a thickness of about 35 nm, and the heatsink layer of the first bi-layer has a thickness of about 15 nm, and
wherein the amorphous under-layer of the second bi-layer has a thickness of about 17.5 nm, and the heatsink layer of the second bi-layer has a thickness of about 32.5 nm.

17. A method for manufacturing an energy assisted magnetic recording (EAMR) system, the method comprising:
forming a magnetic recording medium comprising:
a plurality of bi-layers on a substrate, each of the plurality of bi-layers comprising a heatsink layer and an amorphous under-layer on the heatsink layer; and
a magnetic recording layer on the plurality of bi-layers;
forming a magnetic transducer configured to write information to the magnetic recording medium; and
positioning a light source proximate the magnetic transducer, the light source configured to heat the magnetic recording medium.

18. The method of claim 17, wherein the amorphous under-layer comprises a material selected from the group consisting of CrTi, CrTa, NiTa, CoCrTaZr, CoFeZrBCr, CoTaZr, CoFeTaZr, CoCrWTaZr, CoCrMoTaZr, CoZrWMo, and combinations thereof.

19. The method of claim 17, wherein the heatsink layer comprises a material selected from the group consisting of Ru, W, Mo, Cu, Ag, Cr, Al, Cu—Zr, Mo—Cu, Ag—Pd, Cr—Ru, Cr—V, Cr—W, Cr—Mo, Cr—Nd, and combinations thereof.

20. The method of claim 17, further comprising forming a thermal resistance layer between the magnetic recording layer and the plurality of bi-layers, wherein the thermal resistance layer is configured to facilitate FePt growth.

21. The method of claim 20, wherein the thermal resistance layer comprises a single layer of MgO.

22. The EAMR system of claim 1, wherein the amorphous under-layer is directly on the heatsink layer.

23. The method of claim 17, wherein the amorphous under-layer is directly on the heatsink layer.

* * * * *